United States Patent Office 3,810,923
Patented May 14, 1974

3,810,923
MONOESTER DERIVATIVES OF
OXALOCITROLACTONE
Richard H. Wiley, New York, N.Y., assignor to Miles
Laboratories, Inc., Elkhart, Ind.
No Drawing. Filed Mar. 2, 1972, Ser. No. 231,380
Int. Cl. C07d 5/10
U.S. Cl. 260—343.6
1 Claim

ABSTRACT OF THE DISCLOSURE

The monoester derivatives of oxalocitrolactone are useful as raw materials for the production of citric acid and are prepared by heating triester derivatives of the lactone in the presence of concentrated mineral acid and evaporating the solution until the desired product crystals are formed.

BACKGROUND AND PRIOR ART

The trimethyl and triethyl esters of oxalocitrolactone are known compounds, but all previous attempts to partially hydrolyze these compounds or to convert these compounds through the formation of intermediates to citric acid have been unsuccessful.

SUMMARY OF THE INVENTION

In accordance with the present invention, a novel composition of matter is provided which comprises a product having the formula

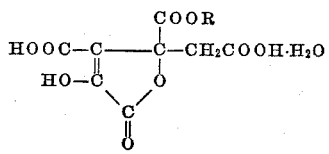

wherein R is $CH_3$ or $C_2H_5$.

DESCRIPTION OF THE INVENTION

The compounds of the present invention can be named oxalocitrolactone monomethyl ester and oxalocitrolactone monoethyl ester or 3-hydroxy-5-carboxymethyl-2H, 5H-dihydrofuran-2-one-4,5-dioic acid monomethyl ester and 3-hydroxy-5-carboxymethyl-2H,5H-dihydrofuran-2-one-4,5-dioic acid monoethyl ester. They are prepared by heating the trimethyl ester of oxalocitrolactone or the triethyl ester of oxalocitrolactone in the presence of concentrated mineral acid, such as hydrochloric acid, and then evaporating the resulting solution until the desired product crystals are formed which can be separated from the reaction mixture.

The products of the present invention are useful in the production of citric acid. They can be reacted with aqueous lithium hydroxide to form a mixture of lithium carbonate and lithium citrate which can be acidified to form citric acid.

The invention is described in further detail in the following examples.

Example 1

Oxalocitrolactone trimethyl ester was prepared from dimethyl oxaloacetate and triethylamine in accordance with the procedure described in Liebig's Annalen 295, 359 (1897) and 363, 16 (1908). The dimethyl oxaloacetate was conveniently prepared by the sodium methoxide catalyzed condensation of methyl acetate with dimethyl oxalate according to known procedures. On recrystallization from water the trimethyl ester product was obtained analytically pure.

One gram of the above trimethyl ester was dissolved in 20 ml. of concentrated hydrochloric acid by heating for twenty minutes at 50° C. The resulting reaction mixture solution was then allowed to evaporate at room temperature (about 20–25° C.) to a volume of about 10 ml. A 0.3 g. portion of crystals was formed and was separated from the liquid and collected and dried in vacuum at 70° C. This hydrated product was analyzed for carbon and hydrogen; calculated for $C_9H_{10}O_{10}$: C, 38.84; H, 3.59; $OCH_3$, 11.05; found, C, 38.93; H, 5.53; $OCH_3$, 11.15. The nuclear magnetic resonance data for this product are also in accord with the assigned structure. Its neutral equivalent was 91.37 (theoretical value is 92.6). It also gave a strongly positive reaction to the ferric chloride enol test (red maroon color). This product was thus identified as the monomethyl ester of oxalocitrolactone.

Utility of this compound is shown in the following example.

Example 2

A 0.05 g. portion of the product of Example 1 was dissolved in 1 ml. of a 5 weight percent aqueous solution of lithium hydroxide and heated at 95° C. for 30 min. The resulting white precipitate consisting of a mixture of lithium carbonate and lithium citrate was collected and dissolved in water. The aqueous solution was then acidified with hydrochloric acid and analyzed by thin layer chromatography using silica gel on polyester sheets as the plate and butanol-formic acid-water as the developing solvent. The plate was dried after spotting at room temperature, developed for 15 min., dried at 80° C. for 15 min. and sprayed with 0.4 percent alcoholic bromocresol green solution. The spots appear as yellow areas on a blue background. The observed $R_f$ value of 63 compares favorably with a control $R_f$ value of 62–67 for citric acid. Citric acid was thus detected in the final product solution.

Example 3

The triethyl ester of oxalocitrolactone was prepared in accordance with the disclosure of Example 1 using diethyl oxaloacetate and triethylamine. The procedure of Example 1 was then repeated to form the hydrated monethyl ester of oxalocitrolactone. The neutral equivalent was observed to be 94.19 while the theoretical value for the monethyl ester hydrate should be 97.3.

This product can also form citric acid by the reaction of Example 2.

What is claimed is:
1. A composition of matter having the formula:

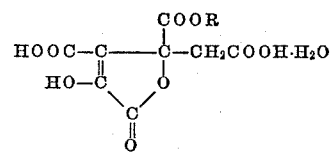

wherein R is $CH_3$ or $C_2H_5$.

References Cited
UNITED STATES PATENTS
3,318,944   5/1967   Wiley _____ 260—343.6

DONALD G. DAUS, Primary Examiner
A. M. T. TIGHE, Assistant Examiner

U.S. Cl. X.R.
260—484 R